United States Patent
Sherman

[15] 3,635,028
[45] Jan. 18, 1972

[54] FLUID PRESSURE PRODUCING ASSEMBLY

[72] Inventor: Clarence A. Sherman, Birmingham, Mich.
[73] Assignee: Benton Corporation, Troy, Mich.
[22] Filed: Nov. 19, 1969
[21] Appl. No.: 878,100

[52] U.S. Cl. ........................................60/54.6 A, 60/54.6 E
[51] Int. Cl. ..............................................................F15b 7/00
[58] Field of Search ......................60/54.5 P, 54.6 P, 54.5 E, 60/54.6 E, 54.5, 54.6, 54.5 A, 54.6 A

[56] References Cited

UNITED STATES PATENTS 3,228,195  1/1966  Brent et al. ...........................60/54.6 A Primary Examiner—Martin P. Schwadron
Assistant Examiner—A. Zupcic
Attorney—Barnard, McGlynn & Reising

[57] ABSTRACT

A fluid pressure producing assembly including a housing with a first piston member movably disposed in a first chamber and an elongated member extending through the first piston with a nose portion thereof which is disposed in a second chamber for defining a second piston. The elongated member has an enlarged intermediate portion which seats with the first piston member and a cavity therein with a relief valve means including a plunger movably disposed in a bore in the nose portion and a conical head section for engaging a female conical seat. A check valve in the form of a sleeve is disposed about a reduced end of the nose portion for blocking fluid communication between the first chamber and the outlet in the second chamber in response to a predetermined pressure in the second chamber or the outlet with the relief valve means thereafter decreasing the pressure in the first chamber in proportion to the increase in pressure in the second chamber.

6 Claims, 5 Drawing Figures

PATENTED JAN 18 1972

INVENTOR.
Clarence A. Sherman
BY
Barnard, McGlynn & Reising
ATTORNEYS

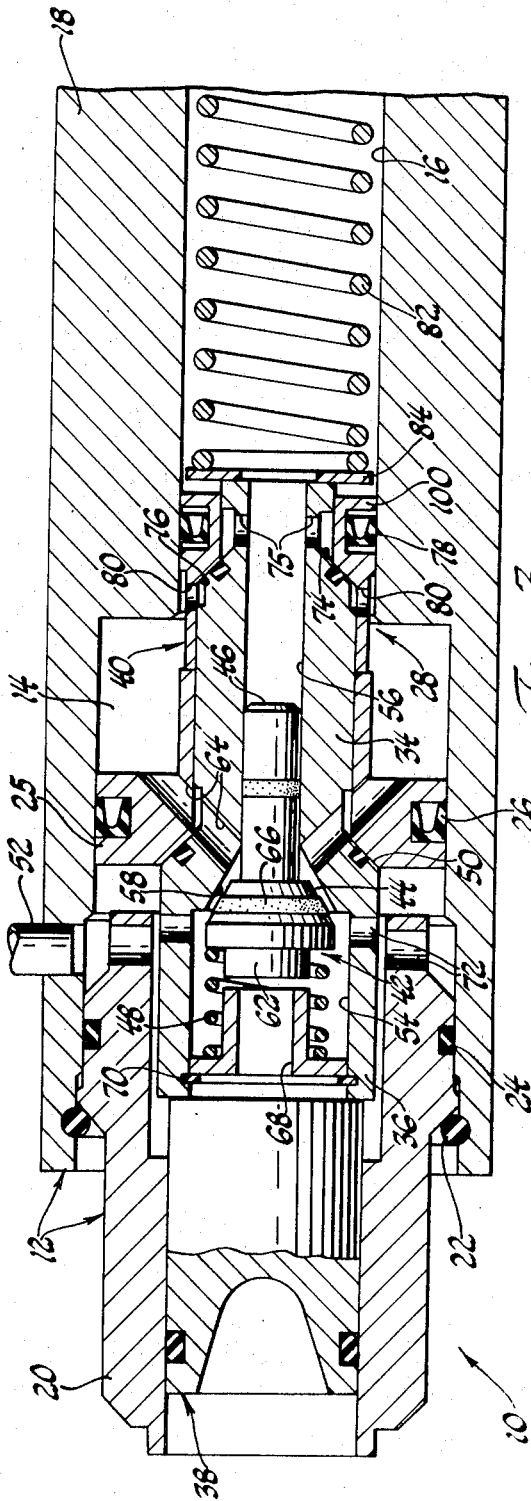
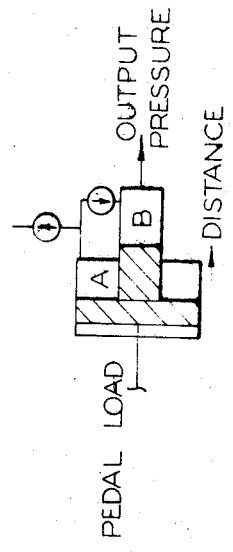
Fig. 5
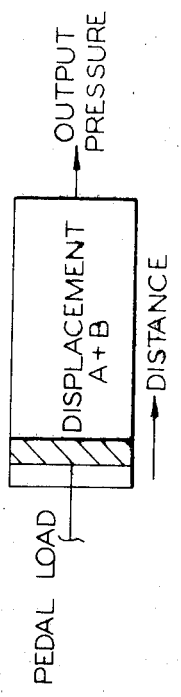
Fig. 4

FLUID PRESSURE PRODUCING ASSEMBLY

This invention relates to a fluid pressure producing assembly of the type utilized as a master cylinder in hydraulic brake systems.

Such assemblies typically include a manual input means which is operatively connected to a brake pedal and an output from which fluid pressure is conveyed to the wheel cylinders.

There are four parameters which are taken into consideration in designing and/or evaluating any such assembly. The first is the output pressure in pounds per square inch which must be delivered by the assembly. The second is referred to as pedal load and is the force in pounds necessarily applied through the pedal to obtain the desired output pressure. In most braking systems, the initial movement of the pedal displaces fluid for bringing the brake shoes into contact with the brake drums. Thus, the third parameter is the fluid displacement of the assembly measured in cubic inches, i.e., the amount or volume of fluid moved through the output as a result of the application of a force to the pedal. The fourth parameter is the distance which the pedal must be manually moved to obtain the desired displacement.

In designing such an assembly, it is desirable that these four parameters be proportional to one another and that they be maintained within certain practical limits.

Early assemblies were of the type disclosed in FIG. 4 and included a cylinder with a single piston slidably disposed therein. As a load in pounds was applied to the pedal to move the piston, a certain displacement of a volume of fluid in cubic inches was accomplished as well as a certain output pressure. The distance the pedal was moved was in direct proportion to the displacement. In this type of system, the pedal load, the displacement, the output pressure and the distance were all proportional to one another, however, the distance the pedal was moved to obtain the desired displacement was unacceptably long.

In order to overcome the disadvantages of the single piston assembly, an assembly utilizing a two-diameter piston, or two pistons of different diameters, was devised. Such an assembly provides an initial movement of a large volume or displacement of fluid under a relatively low pressure and in a relatively short distance for bringing the brake shoes into contact with the brake drums and subsequent movement of a relatively small volume of fluid under high pressure by the smaller piston for actually applying the braking force. Such a system is disclosed in FIG. 5 wherein the displacement of the large piston is indicated by "A" and displacement of the small piston is indicated by "B." The chamber of the large piston is connected through a check valve to the chamber of the small piston and an unloading valve is in communication with the chamber of the large piston. During initial movement of the two pistons, a large displacement is achieved to move the brake shoes into contact with the brake drums. When the brake shoes have contacted the brake drums, there is a demand for an increased pressure which is produced by the small piston with this pressure being prevented from moving back to the chamber of the large piston by the check valve. At this pressure point the unloading valve opens to allow the free flow of fluid from the chamber of the large piston. In this system, the large capacity or displacement of fluid occurs in a relatively short distance or small movement of the pedal. As the pedal is moved and fluid is displaced by both the large and small pistons, a predetermined load is necessarily applied to the pedal. However, when a predetermined pressure is reached and the fluid being displaced by the large piston is dumped through the unloading valve, there is a sudden decrease in pedal load because the small piston is then the sole acting component for producing the output pressure. Because of this, the pedal load remains proportional with the output pressure but there is an abrupt change in the ratio and this invention overcomes this problem.

Accordingly, it is an object and feature of this invention to provide such a fluid pressure producing assembly which includes control means for blocking fluid communication between the chamber of the large piston and the outlet when the pressure at the outlet reaches a predetermined value and for decreasing the pressure in the chamber of the large piston as the pressure at the outlet or in the chamber of the small piston increases whereby there is no abrupt change in the ratio between the pedal load and the output pressure and there is not a sudden decrease in the pedal load at the point where the small piston is the sole pressure producing component.

In correlation with the foregoing object and feature, it is another object and feature of this invention to provide such a pressure producing assembly wherein the control means blocks fluid communication between the chamber of the large piston and the outlet means or the chamber of the small piston in response to a predetermined pressure at the outlet means and for thereafter decreasing the pressure in the chamber of the large piston in proportion to the increase in pressure at the outlet or the chamber of the small piston.

In correlation with the foregoing objects and features, it is another object and feature of this invention to provide such a fluid pressure producing assembly wherein the control means includes a relief valve means responsive to pressures in the chamber of the large piston and at the outlet respectively for decreasing the pressure in the chamber of the large piston.

Other objects and attendant advantages of the present invention will be readily appreciated as the same becomes better understood by reference to the following detailed description when considered in connection with the accompanying drawings wherein:

FIG. 4 is a schematic view of a prior art single piston assembly; and

FIG. 5 is a schematic view of another prior art assembly.

Referring now to the drawings wherein like numerals indicate like or corresponding parts throughout the several views, a fluid pressure producing assembly constructed in accordance with the instant invention is generally shown at 10.

Figure 1:
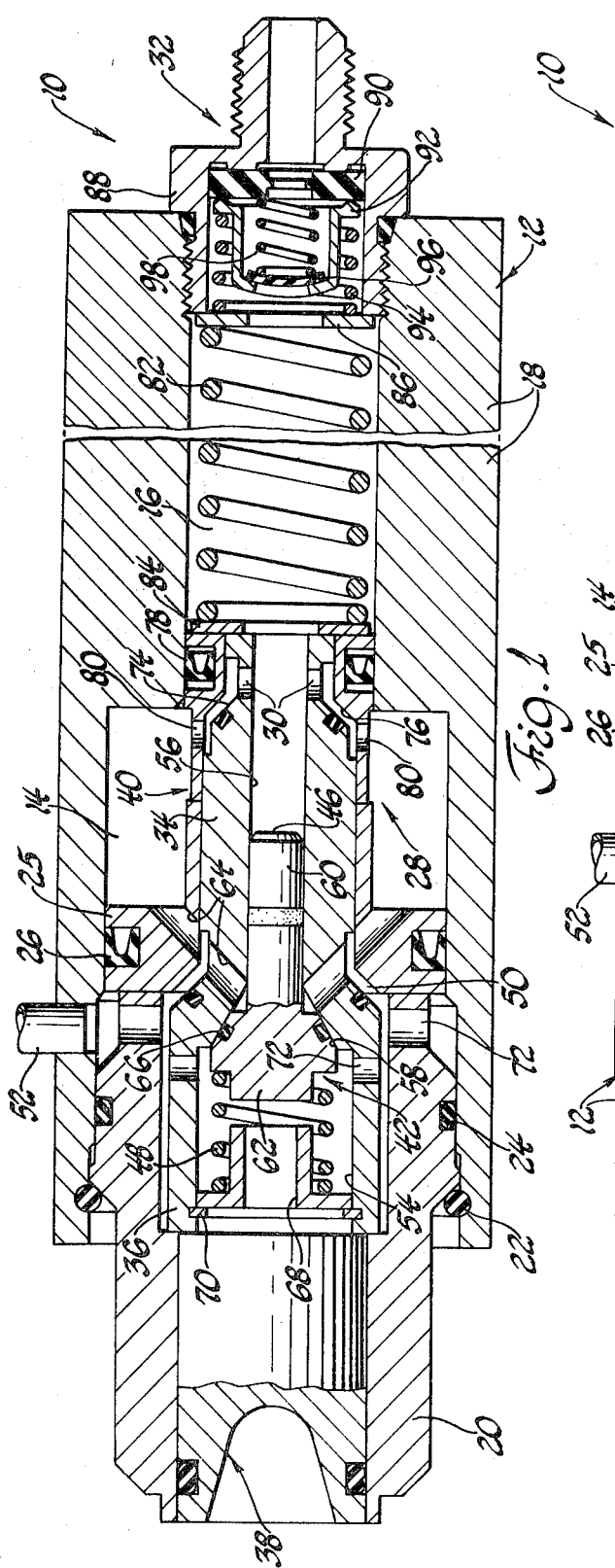
FIG. 1 is a fragmentary cross-sectional view of a preferred embodiment of the instant invention showing the assembly in the position when no load is applied to the input.

The assembly includes a housing means generally indicated at 12 and defining a first fluid chamber 14 and a second fluid chamber 16. The housing means comprises the parts 18 and 20 with the part 20 being retained within the part 18 by a snap ring 22, or the like. A seal 24 is disposed between the parts 18 and 20.

The assembly also includes a first piston means comprising first piston member 25 in sealing and sliding engagement with the first chamber 14. The first piston member 25 is in sealing engagement with the first chamber 14 by way of a seal 26.

A second piston means generally indicated at 28 is movably disposed in the second chamber 16. It will be noted that the first chamber 14 has a larger diameter than the second chamber 16 and the second chamber 16 is concentric with and extends from the first chamber 14.

Figure 2:
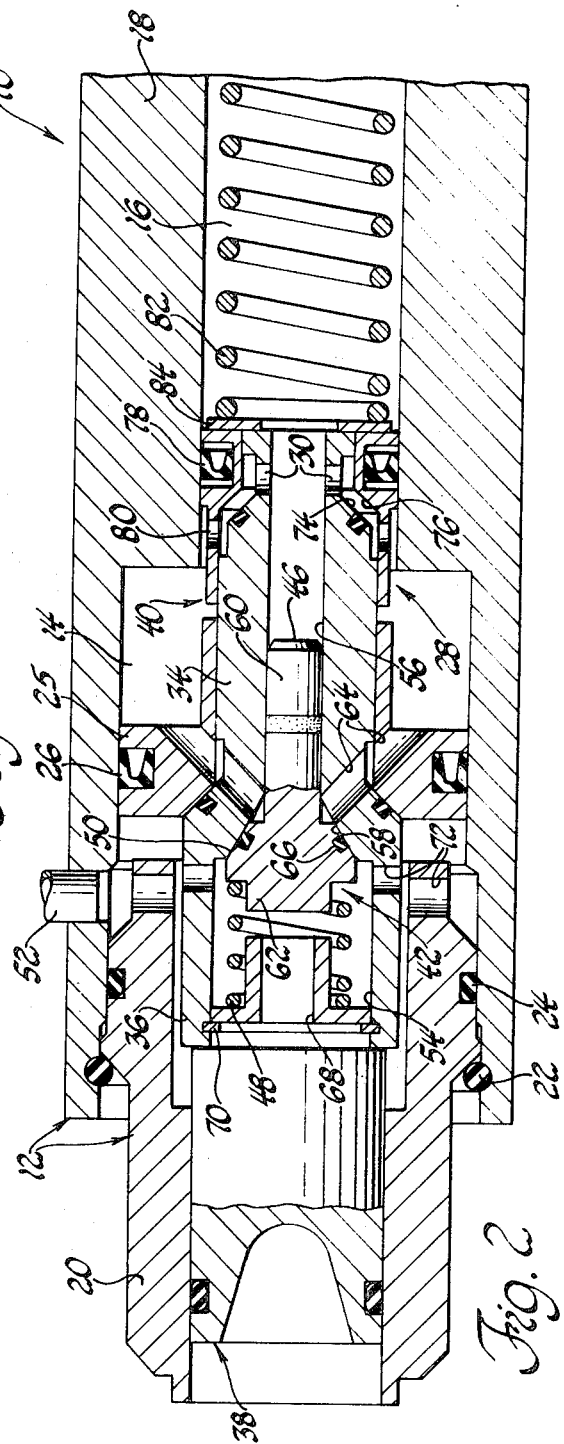
FIG. 2 is a view similar to FIG. 1 but showing the assembly in the condition with a force applied to the input and with both the large and small pistons providing pressure to the output; the assembly in the condition where the output pressure is being supplied solely by the small piston.

As best illustrated in FIGS. 1 and 2, passage means generally indicated at 30 establish fluid communication between the first chamber 14 and the second chamber 16 and the outlet means generally indicated at 32.

The second piston means 28 is defined by a nose portion 34 of an elongated member which also includes an intermediate enlarged portion 36. The nose portion 34 extends through the first piston member 25 and into the second chamber 16 to a first end thereof.

The assembly also includes an input means generally indicated at 38 for moving the first and second piston means to force fluid to the outlet means 32. The input means 38 comprises a cylindrical member slidably disposed in the part 20 of the housing means and adapted to be connected to or responsive to brake pedal movement. The input means 38 is adjacent to and in contact with the intermediate portion 36.

The assembly also includes a check valve means generally indicated at 40 and relief valve means generally indicated at 42. The check valve means 40 and the relief valve means 42 comprise control means for blocking fluid communication between the first chamber 14 and the second chamber 16 or outlet means 32 when the pressure at the outlet means 32 or in the second chamber 16 reaches a predetermined value and for decreasing the pressure in the first chamber 14 as the pressure at the outlet means 32 or in the second chamber 16 increases. More specifically, the control means blocks fluid communication between the first chamber 14 and the outlet means 32 in response to a predetermined pressure at the outlet means 32 and thereafter decreases the pressure in the first chamber 14 in proportion to the increase in pressure at the outlet means 32.

The check valve means 40 is disposed in the passage means 30 between the first chamber 14 and the outlet means 32 for blocking fluid communication between the first chamber 14 and the outlet means 32 when the pressure at the outlet means 32 reaches the predetermined value. The relief valve means 42 is responsive to pressures in the first chamber 14 and at the outlet means 32, or the second chamber 16, respectively for accomplishing the decrease of pressure in the first chamber 14 in proportion to the increase in pressure in the second chamber 16 or the outlet means 32.

The relief valve means 42 includes a first area as shown in FIG. 3 at 44 in fluid communication with the first chamber 14 and a second area 46 in fluid communication with the outlet means 32 or the second chamber 16. The relief valve means is movable between an open position as shown in FIG. 3 and a closed position as shown in FIGS. 1 and 2. There is also included biasing means comprising the spring 48 for urging the relief valve means 42 to the closed position.

The intermediate portion 36 of the elongated member has a larger diameter than the nose portion 34 and is engageable with the first piston member 25 at a conical interface 50. A seal is disposed in the male conical surface of the elongated member to coact with the first piston member 25 to prevent fluid flow therebetween at the conical interface 50.

The housing means 12 includes a conduit 52 which is in fluid communication with the source of hydraulic fluid. The intermediate portion 36 has a cavity 54 therein. A bore 56 extends from the cavity 54 to the first end of the nose portion 34 so as to be in fluid communication with the second chamber 16. A seat interconnects the bore 56 and the cavity 54 and is defined by a female conical surface 58 in the elongated member between the bore 56 and the cavity 54. The relief valve means 42 includes a valve member having a plunger section 60 and a head section 62. The plunger section 60 is sealingly and slidably disposed in the bore 56. A seal is disposed about the plunger section 60 to engage the bore 56. The head section 62 is movable into and out of sealing engagement with the conical surface 58.

First passages 64 extend through the elongated member adjacent the seat 58 and through the first piston member 25 for establishing fluid communication between the first chamber 14 and the seating surface 58.

The head section 62 includes a male conical surface which mates with the female conical surface or seat 58 and a seal 66 is disposed in the male conical surface for sealing engagement with the female conical surface or seat 58. The first area 44 of the relief valve means is defined by the head section 62 and more specifically is defined by the male conical surface in the area between the seal 66 and the plunger section 60. The effective pressure area is the difference in area in the radial direction between the plunger section 60 and the seal 66. The second area 46 is defined by the end of the plunger section 60.

A guide member 68 is retained in the cavity 54 by a snap ring 70 and coacts with the spring 48 so that the spring 48 reacts between the intermediate portion 36 of the elongated member and the head section 62 for urging the relief valve means 42 to the closed position with the head section 62 in sealing engagement with the female conical seat 58 to prevent fluid flow from the first chamber 14 through the first passages 64 and into the cavity 54.

Second passages 72 extend through the intermediate portion 36 and through the part 20 of the housing means 12 for establishing fluid communication between the cavity 54 and a source of fluid 52.

The check valve means 40 is disposed on the first and of the nose portion 34. The first end of the nose section 34 has a reduced diameter which defines a male conical sealing surface 74 with the passage means 30 including passages 75 adjacent to the male conical sealing surface 74 and in fluid communication with the bore 56. The check valve means 40 comprises a sleeve disposed about the nose portion 34 and having a female conical seat 76 which is engageable with the male conical seat 74 to prevent fluid flow between the first and second chambers 14 and 16. A seal is disposed in the male conical surface 74 for sealing engagement with the female conical surface 76. A seal 78 is disposed about the sleeve and is in sealing engagement with the second chamber 16. The passage means 30 also includes the passages 80 in the sleeve.

The outlet means 32 is disposed at the end of the second chamber 16 opposite to the first chamber 14. The spring means 82 reacts between the end of the second chamber 16 and the first end of the nose section 34. More specifically, a washerlike element 84 engages the first end of the nose portion 34 and a similar washerlike element 86 is disposed in abutting engagement with a plug 88 and the spring means 82 reacts therebetween.

The output means 32 includes the plug 88 which threadedly engages the part 18 of the housing means 12 and a check valve. A resilient washerlike member 90 is disposed within the plug 88 and a cap 92 is biased thereagainst by a spring 94. A diaphragm 96 normally covers an opening in the top of the cap 92 and is biased into position by a spring 98.

OPERATION

The assembly is in the condition illustrated in FIG. 1 when no force is applied to the input means 38. In this condition, fluid flows through the inlet 52 and through the passages 72 to fill the cavity 54. Fluid also flows through the conical seat 50 between the first piston member 25 and the intermediate portion 36 and through the passages 64 to fill the chamber 14. Fluid passes through the passages 80 in the sleeve of the check valve and between the conical surfaces 74 and 76 and through the passages 75 for filling the second chamber 16.

In operation, the forces applied to the input means 38, as through a brake pedal, move the input means 38 to the right. Upon movement of the input means 38 to the right, the seating surfaces of the conical surfaces 50 seat and immediately thereafter the intermediate portion 36 moves to the right to engage and move the first piston member 25 to the right.

The effective area of the small piston means is the area at the end of the nose portion 34 as well as the area 100 at the end of the sleeve defining the check valve means 40 and the area 46 at the end of the plunger 60.

During initial movement, fluid from the chamber 14 moves through the passages 80 and the passage means 30 to the second fluid chamber 16. During this initial movement, there is sufficient pressure resulting from movement of the first piston member 25 in the first chamber 14 to react against the effective area of the sleeve of the check valve, which effective area is that radial area between the outer diameter of the sleeve in sealing engagement with the chamber 16 and the seal in the seating surface 74, to cause the sleeve of the check valve means 40 to remain in the open position illustrated in FIG. 2 to allow fluid to move to the second chamber 16 and out the outlet means 32.

When the pressure at the outlet means 32 or in the second chamber 16 reaches a predetermined value, as when or after the brake shoes have been moved into contact with the brake drum, this pressure acts against effective area 46 of plunger 60 and against the effective area 44 of the head section 62 to move the head section 62 from seating surface 58 thereby reducing the pressure in chamber 14 and allowing seating surfaces 74 and 76 to move into sealing engagement whereby chamber 14 is isolated from chamber 16.

Thereafter pressure in the first chamber 14 acts solely through the passages 64 upon the head section 62 of the relief valve means 42 on the first area 44 in conjunction with chamber 16 pressure acting on area 46. From this point on, the head section 62 will continually seat and unseat as the pressure in chamber 16 increases thereby proportionally decreasing the pressure in chamber 14.

If at this point the assembly were constructed so as to totally relieve the pressure in the first chamber 14, the pedal load or the force necessary to move the input means 38 to the right would decrease because there would be no load resulting from the movement of the first piston member 25 to the right. In the instant assembly, however, the fluid in the first chamber 14 resists the movement of the first piston member 25 to the right but that resistance decreases as the resistance to the movement of the small piston increases.

In order to illustrate this, it will be assumed that the spring 48 applies a force of 30 pounds to urge the head section 62 to the closed position illustrated in FIGS. 1 and 2. It will also be assumed that the effective pressure area 44 equals one-tenth of a square inch and that the effective area 46 of the plunger 60 equals one-twentieth of a square inch. It is further assumed that the assembly is constructed such that when the pressure at the outlet means 32 or in the second chamber 16 reaches 200 pounds per square inch, the check valve means 40 will close preventing further fluid communication between the first chamber 14 and the second chamber 16. At this point of operation or at this predetermined pressure in the second chamber 16, the force urging the relief valve means 42 to the open position is the effective area 44 of the head section 62 multiplied by the pressure transmitted thereto through the passages 64 from the first chamber 14 plus the effective area 46 on the plunger 60 multiplied by the pressure transmitted thereto from the second chamber 16. The effective area 44 of one-tenth of a square inch times the pressure of 200 pounds per square inch applied thereagainst equals 20 pounds. In a like manner, the effective area 46 of one-twentieth of a square inch times the pressure of 200 pounds applied thereagainst equals 10 pounds of force. Thus, adding these together there is a resultant 30 pound force urging the relief valve means 42 to the open position. This 30 pounds is counterbalanced by the 30 pounds of force applied to the relief valve means 42 by the spring 48.

If, however, a larger force is applied to the input means 38, the pressure in the second chamber 16 increases. Assuming that the pressure in the second chamber 16 increases to 300 pounds per square inch, the force applied against the plunger 60 is the effective area 46 of one-twentieth of a square inch times 300 pounds per square inch which equals 15 pounds. Thus, the only force that need be applied to the effective area 44 of the head section 62 is slightly more than 15 pounds to move the relief valve means 42 to the open position against the 30 pound force applied thereto by the spring 48. With the effective area 44 being one-tenth of a square inch, it is quickly determined that only a pressure of 150 pounds per square inch in the first chamber 14 is necessary to counterbalance the force of the spring 48.

Carrying the process one step further, if the pressure in the second chamber 16 reaches 600 pounds per square inch, there is a force of 30 pounds against the plunger 60 and therefore any pressure above a zero in the first chamber 14 will overcome the force of 30 pounds of the spring 48 and open the relief valve means 42.

It is therefore readily apparent that the large piston or first piston member 25 has its movement decreasingly resisted by fluid in the first chamber 14 in proportion to the increase in pressure in the second chamber 16 or said another way, inversely in proportion to the increase in pedal load necessary to move the small piston means to the right to obtain the increased pressure at the output means 32.

The embodiments of the invention in which an exclusive property or privilege is claimed are defined as follows:

1. A fluid pressure producing assembly comprising: housing means defining first and second fluid chambers, first piston means movably disposed in said first chamber; second piston means movably disposed in said second chamber; passage means establishing fluid communication between said chambers and an outlet means, input means for moving said first and second piston means to force fluid to said outlet means, control means for blocking fluid communication between said first chamber and said outlet means in response to a predetermined pressure at said outlet means and for thereafter decreasing the pressure in said first chamber in proportion to the increase in pressure at said outlet means, said control means including relief valve means responsive to pressures in said first chamber and at said outlet means respectively for accomplishing said decreasing of pressure in said first chamber and check valve means in said passage means between said first chamber and said outlet means for accomplishing said blocking of fluid communication between said first chamber and said outlet means, said relief valve means having a fist area in communication with said first chamber and a second area in fluid communication with said outlet means, said relief valve means being movable between open and closed positions, and biasing means for urging said relief valve means to said closed position, said first chamber having a larger diameter than said second chamber and said second chamber being concentric with and extending from said first chamber, said first piston means comprising a first piston member in sealing sliding engagement with said first chamber, said second piston means being defined by a nose portion of an elongated member, said nose portion extending through said first piston member and into said second chamber to a first end thereof, said elongated member including an intermediate portion having a larger diameter than said nose portion, said intermediate portion being engageable with said first piston member, said intermediate portion having a cavity therein, a bore extending from said cavity to said first end of said nose portion so as to be in fluid communication with said second chamber, a seat interconnecting said bore and said cavity, said relief valve means including a valve member having a plunger section sealingly and slidably disposed in said bore and a head section movable into and out of sealing engagement with said seat, first passages extending through said elongated member and through said first piston member for establishing fluid communication between said first chamber and said seat, said first area being defined by said head section and said second area being defined by the end of said plunger section, said biasing means being disposed in said cavity to react between said elongated member and said head section for urging said relief valve means to said closed position with said head section in sealing engagement with said seat to prevent fluid flow from said first chamber through said first passages and into said cavity, and second passages extending through said intermediate portion and said housing means for establishing fluid communication between said cavity and a source of fluid.

2. An assembly as set forth in claim 1 wherein said input means is adjacent to and connected to said intermediate portion.

3. An assembly as set forth in claim 2 wherein said check valve means is disposed on said first end of said nose portion.

4. An assembly as set forth in claim 3 wherein said outlet means is disposed at the end of said second chamber opposite to said first chamber, and spring means reacting between said end of said second chamber and said first end of said nose section.

5. An assembly as set forth in claim 4 wherein said first end of said nose section has a reduced diameter and a male conical sealing surface with third passages adjacent thereto in fluid communication with said bore, said check valve means comprises a sleeve disposed about said nose portion and having a female conical seat engageable with said male conical seat to prevent fluid flow between said first and second chambers.

6. An assembly as set forth in claim 5 wherein said seat is defined by a female conical surface in said elongated member and said head section includes a male conical surface, a seal disposed in said male conical surface for sealing engagement with said female conical surface so that said first area is defined by said conical surface between said seal and said plunger section.

* * * * *